United States Patent
Taylor et al.

(10) Patent No.: US 8,707,686 B2
(45) Date of Patent: Apr. 29, 2014

(54) FLEXIBLE REGENERATION TIME OF DIESEL PARTICULATE FILTER BASED ON FUEL EFFICIENCY

(75) Inventors: Michael V. Taylor, Wolverine Lake, MI (US); Michelangelo Ardanese, Royal Oak, MI (US); Paul Jasinkiewicz, Northville, MI (US); Andrea Gravili, Lecce (IT); Giuseppe Schiavone, Bitonto (IT)

(73) Assignee: GM Global Technology Operations LLC, Detroit, MI (US)

( * ) Notice: Subject to any disclaimer, the term of this patent is extended or adjusted under 35 U.S.C. 154(b) by 222 days.

(21) Appl. No.: 13/421,919

(22) Filed: Mar. 16, 2012

(65) Prior Publication Data

US 2013/0239550 A1  Sep. 19, 2013

(51) Int. Cl.
```
F01N 3/00      (2006.01)
F01N 3/10      (2006.01)
F01N 3/02      (2006.01)
F01N 3/023     (2006.01)
F01N 3/021     (2006.01)
F01N 3/025     (2006.01)
F01N 9/00      (2006.01)
F01N 11/00     (2006.01)
```
(52) U.S. Cl.
CPC ............... *F01N 3/023* (2013.01); *F01N 3/021* (2013.01); *F01N 3/0253* (2013.01); *F01N 9/002* (2013.01); *F01N 11/00* (2013.01); *F01N 2900/1606* (2013.01)
USPC .......... 60/295; 60/274; 60/396; 60/303; 60/311

(58) Field of Classification Search
CPC ......... F01N 3/021; F01N 3/023; F01N 3/025; F01N 3/0253; F01N 9/002; F01N 11/00; F01N 2610/03; F01N 2900/0412; F01N 2900/0422; F01N 2900/1606
USPC ............................ 60/274, 286, 295, 303, 311
See application file for complete search history.

(56) References Cited

U.S. PATENT DOCUMENTS

2007/0256408 A1* 11/2007 Kogo et al. .................. 60/286

* cited by examiner

*Primary Examiner* — Audrey K Bradley
(74) *Attorney, Agent, or Firm* — Quinn Law Group, PLLC

(57) ABSTRACT

A method of controlling an exhaust gas treatment system includes measuring a quantity of fuel used by the vehicle during a defined time period of a regeneration event, and estimating a quantity of particulate matter being burnt from a particulate filter during the defined time period to define a particulate matter burn rate. The quantity of fuel used is compared with the calculated particulate matter burn rate to define a regeneration fuel efficiency ratio. The regeneration fuel efficiency ratio is compared to a minimum regeneration fuel efficiency rate to determine if the regeneration event is an efficient use of fuel or is not an efficient use of fuel. The regeneration event is stopped prior to an estimated completion of the regeneration event when the comparison of the regeneration fuel efficiency ratio to the minimum regeneration fuel efficiency rate indicates that the regeneration event is not an efficient use of fuel.

20 Claims, 2 Drawing Sheets

FLEXIBLE REGENERATION TIME OF DIESEL PARTICULATE FILTER BASED ON FUEL EFFICIENCY

TECHNICAL FIELD

The invention generally relates to a method of controlling an exhaust gas treatment system of a vehicle, and more specifically to controlling the operation of a regeneration event for regenerating a particulate filter of the exhaust gas treatment system.

BACKGROUND

Exhaust gas treatment systems for treating exhaust gas from an engine of a vehicle may include a particulate filter. If the engine is a diesel engine, then the particulate filter may be referred to as a diesel particulate filter. The particulate filter traps particulate matter, i.e., soot, from the exhaust gas of the engine. The particulate filter may include one or more substrates that define a plurality of apertures, through which the exhaust gas must flow. The particulate matter collects on the substrate as the exhaust gas flows through the apertures. The particulate filter is occasionally regenerated to remove the collected particulate matter. Regeneration of the particulate filter includes heating the particulate filter to a temperature sufficient to burn the collected particulate matter for a time period sufficient to completely burn all of the particulate matter off of the substrates of the particulate filter, which converts the particulate matter to carbon dioxide that dissipates into the atmosphere.

During some vehicular operating conditions, such as when the engine is operating under a very light load, the engine may consume little fuel and not generate sufficient excess heat to properly heat the particulate matter during regeneration of the particulate filter. In order to properly and completely heat the particulate matter, fuel may be added to the exhaust gas to burn upstream of the particulate filter. Accordingly, regeneration of the particulate filter may require consumption of fuel when not otherwise needed to power the vehicle. When the engine is operating under a light load, the additional fuel used to regenerate the particulate filter may be substantial. Furthermore, the rate at which the particulate matter is burnt from the particulate filter may slow during the regeneration event. As such, the amount of fuel required to burn a given quantity of particulate matter of the beginning of a regeneration event may increase toward the end of the regeneration event, further decreasing the fuel efficiency when the vehicle is regenerating the particulate filter while the engine is operating under a light load.

SUMMARY

A method of controlling an exhaust gas treatment system of a vehicle is provided. The method includes detecting the start of a regeneration event in which accumulated particulate matter is burnt from a particulate filter. A quantity of fuel used by the vehicle during a defined time period of the regeneration event is monitored. A quantity of particulate matter being burnt from the particulate filter during the defined time period of the regeneration event is estimated to define a particulate matter burn rate. The quantity of fuel used is compared with the calculated particulate matter burn rate to define a regeneration fuel efficiency ratio. The regeneration fuel efficiency ratio is compared to a minimum regeneration fuel efficiency rate to determine if the regeneration event is an efficient use of fuel or is not an efficient use of fuel. The regeneration event is stopped prior to an estimated completion of the regeneration event when the comparison of the regeneration fuel efficiency ratio to the minimum regeneration fuel efficiency rate indicates that the regeneration event is not an efficient use of fuel.

A method of controlling a vehicle is also provided. The method includes providing a control module operable to control the operation of a regeneration event. The control module is operable to monitor the operation of the vehicle to predict accumulation of particulate matter on a particulate filter of an exhaust gas treatment system. A regeneration event is initiated when the predicted accumulation of the particulate matter on the particulate filter indicates that regeneration of the particulate filter is required. A quantity of fuel used by the vehicle is sensed during a defined time period of the regeneration event. A quantity of particulate matter being burnt from the particulate filter is predicted during the defined time period with a computer model of the exhaust gas treatment system. The quantity of particulate matter burnt is predicted in order to define a particulate matter burn rate during the defined time period. The computer model of the exhaust gas treatment system is configured to model the operation of the exhaust gas treatment system. The quantity of fuel used is compared with the particulate matter burn rate to define a regeneration fuel efficiency ratio during the defined time period. The regeneration fuel efficiency ratio is compared to a minimum regeneration fuel efficiency rate to determine if the regeneration event is an efficient use of fuel or is not an efficient use of fuel. The control module stops the regeneration event prior to an estimated completion of the regeneration event when the comparison of the regeneration fuel efficiency ratio to the minimum regeneration fuel efficiency rate indicates that the regeneration event is not an efficient use of fuel.

Accordingly, the comparison of the regeneration fuel efficiency ratio to the minimum regeneration fuel efficiency rate is used to indicate whether the fuel being used to complete the regeneration of the particulate filter is an efficient use of fuel. If it is not, then the regeneration event may be stopped prior to complete regeneration of the particulate filter. For example, if the vehicle is operating under a light load in which little fuel is consumed to power the vehicle, the addition of extra fuel for the purpose of regenerating the particulate filter, particularly toward the end of the regeneration event when the particulate matter burn rate decreases, may not be an efficient use of fuel, and the regeneration event may be stopped prior to completion. This operating strategy lessens fuel consumption as well as oil dilution when in-cylinder fuel injection is used to heat the exhaust gas for the regeneration event.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
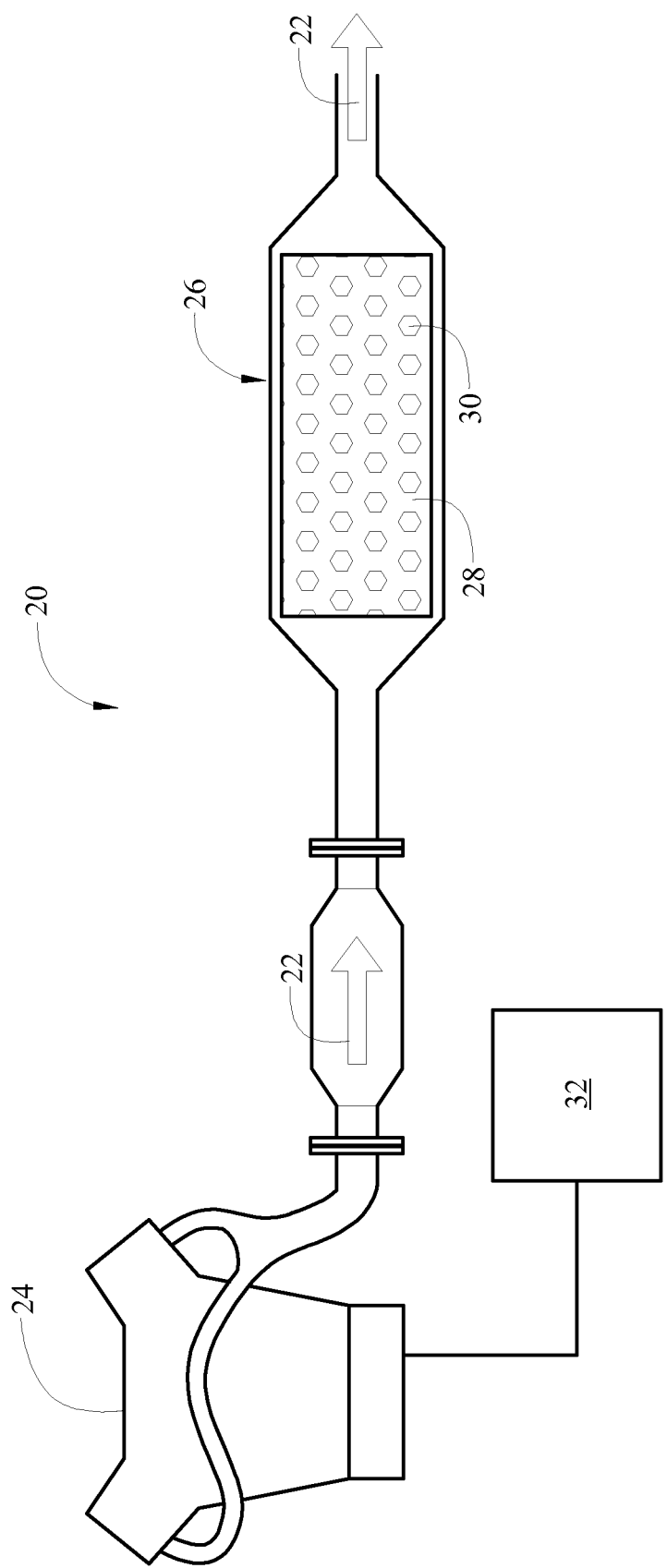
FIG. 1 is a schematic diagram of an engine and an exhaust system of a vehicle.

Referring to FIG. 1, wherein like numerals indicate like parts throughout the several views, an exhaust gas treatment system for a vehicle is shown generally at 20. The exhaust gas treatment system 20 directs and treats exhaust gas, generally indicated by flow arrows 22, from an internal combustion engine 24. The engine 24 preferably includes a diesel engine 24, but may alternatively include some other style of engine 24, such as but not limited to a gasoline engine 24.

The exhaust gas treatment system 20 includes a particulate filter 26. The particulate filter 26 filters particulate matter, i.e., soot, from the exhaust gas of the engine 24. The particulate filter 26 may include one or more substrates 28 that define a plurality of apertures 30, through which the exhaust gas must flow. The particulate matter collects on the substrates 28 as the exhaust gas flows through the apertures 30. The particulate filter 26 is occasionally regenerated to remove the collected particulate matter. Regeneration of the particulate filter 26 includes heating the particulate filter 26 to a temperature sufficient to burn the collected particulate matter for a time sufficient to completely burn all of the particulate matter from the substrate 28. Burning the particulate matter converts the particulate matter to carbon dioxide that dissipates into the atmosphere.

The vehicle may include a control module 32, such as but not limited to an engine 24 control unit, to control the start and stop of the regeneration of the particulate filter 26. The control module 32 may include a computer and/or processor, and include all software, hardware, memory, algorithms, connections, sensors, etc., necessary to manage and control the regeneration of the particulate filter 26. As such, a method, described below and generally shown in FIG. 2 at 34, may be embodied as a program operable on the control module 32. It should be appreciated that the control module 32 may include any device capable of analyzing data from various sensors, comparing data, making the necessary decisions required to control the regeneration of the particulate filter 26, and executing the required tasks necessary to control the regeneration event.

Figure 2:
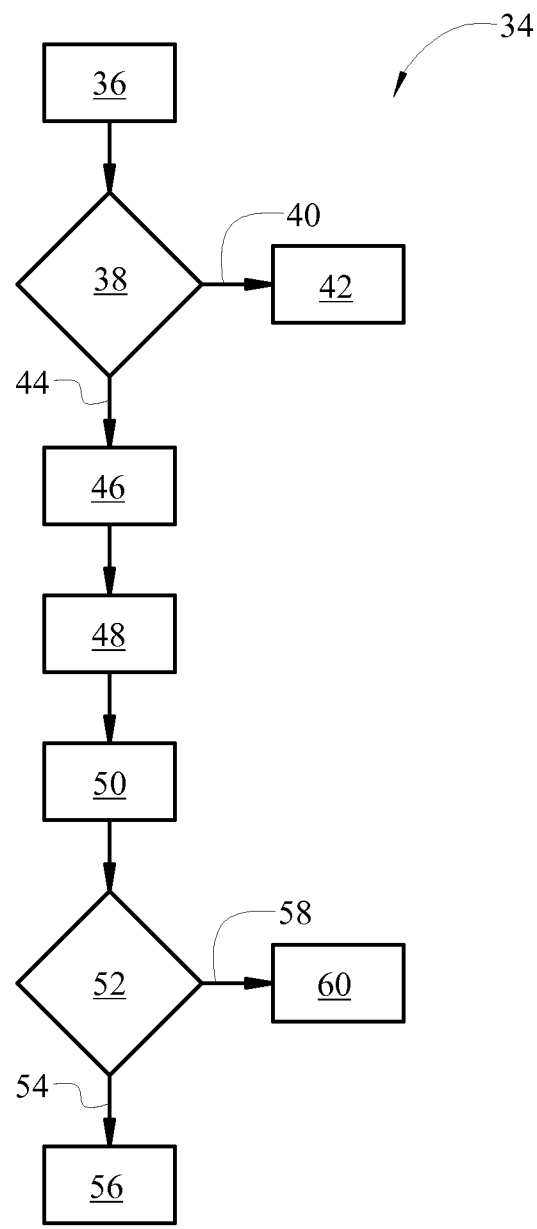
FIG. 2 is a flow chart showing a method of controlling regeneration of a particulate filter of the exhaust system.

Referring to FIG. 2, a method of controlling a vehicle, and more specifically a method of controlling the exhaust gas treatment system 20, is generally shown at 34. The method includes providing the control module 32 operable to control the operation of a regeneration event. As noted above, the control module 32 includes all software, hardware, memory, algorithms, connections, sensors, etc. necessary to manage and control the regeneration of the particulate filter 26. The control module 32 is configured to perform the various tasks of the method described below.

The method includes monitoring the operation of the vehicle, generally indicated by block 36. Various operating parameters of the vehicle, such as engine 24 speed, vehicle speed, fuel consumption, exhaust temperature, torque output, ambient temperature, etc., may be monitored. The various operating parameters are communicated to the control module 32, and used by the control module 32 to predict total accumulation of particulate matter on the particulate filter 26. The control module 32 may use a computer model that estimates or predicts the buildup of particulate matter on the particulate filter 26 based on one or more of the various operating parameters monitored by the control module 32. The quantity of particulate matter that is predicted or estimated to have accumulated on the particulate filter 26 since the last regeneration event is used to determine if the next regeneration event of the particulate filter 26 is required, generally indicated by block 38. If the model predicts or estimates that a regeneration event is not required, generally indicated at 40, then no further action is taken, generally indicated by block 42. If the model predicts that the particulate filter 26 has accumulated sufficient particulate matter to require regeneration of the particulate filter 26, then the control module 32 determines that the regeneration event is required, generally indicated at 44.

Once the control module 32 determines that the next regeneration event is required, then the control module 32 may then estimate a time duration required to completely regenerate the particulate filter 26. The amount of time required to regenerate the particulate filter 26 may depend on various factors, including the current operating condition of the vehicle and/or the engine 24. Typically, regeneration of the particulate matter requires that fuel be injected into the exhaust gas and burnt upstream of the particulate filter 26 in order to produce sufficient heat to regenerate the particulate filter 26. The control module 32 must determine how long to maintain the required fuel injection in order to completely regenerate the particulate filter 26.

When the predicted accumulation of the particulate matter on the particulate filter 26 indicates that regeneration of the particulate filter 26 is required, then the control module 32 may then initiate the regeneration event, generally indicated by box 46, and simultaneously detect the start of the regeneration event. At the initiation of the regeneration event, the control module 32 may control the injection of fuel into the exhaust gas to increase the temperature of the exhaust gas. The amount of fuel required depends on the specific operating conditions of the vehicle and/or the engine 24 at the time of the regeneration event. If the vehicle is moving slowly with the engine 24 operating under a light load, thereby producing less heat in the exhaust gas, then more fuel may be required for regeneration than if the engine 24 is operating under a heavy load and producing a greater amount of heat. The control module 32 may track or monitors the elapsed time of the regeneration event to determine a state of completion of the regeneration event.

At some point during the regeneration event, the control module 32 will determine if the use of fuel to increase the temperature of the exhaust gas for regenerating the particulate filter 26 is an efficient use of fuel or is not an efficient use of fuel. Accordingly, a time period over which this determination is made is defined. It should be appreciated that the time period may include a specific time, or a period of time over which the determination is made. The defined time period may be defined by any manner of determining a point in time during the regeneration event at which the determination is to be made. For example, if the control module 32 determines that the regeneration event will require X minutes to complete, then the time period may be defined as occurring at (X)-(Y) minutes, wherein Y is a pre-defined number of minutes and less than time period X. Preferably, however, the defined time period is defined to include a period of time immediately preceding a threshold. The threshold is equal to a completion percentage of the regeneration event. Accordingly, the threshold may be defined to occur when the control module 32 estimates that the regeneration event is 80% complete, with the time period defined to include the time that transpires between 60% and 80% completion of the regeneration event.

As noted above, the control module 32 may sense and/or monitor one or more operating parameters of the vehicle. One of the operating parameters may include a quantity of fuel used by the vehicle during the defined time period of the regeneration event. The quantity of fuel sensed includes all fuel required to power the vehicle for the current operating conditions, as well as all fuel injected into the exhaust gas for the regeneration event. If the engine 24 is operating under a light load, the amount of fuel used to power the vehicle may be low, while the amount of fuel injected into the exhaust gas for regeneration of the particulate filter 26 may be high. If the engine 24 is operating under a heavy load, the amount of fuel used to power the vehicle may be high, while the amount of fuel injected into the exhaust gas for regeneration of the particulate filter 26 may be low.

A quantity of particulate matter being burnt from the particulate filter 26 during the defined time period is estimated and/or predicted, generally indicated by box 48, with the computer model of the exhaust gas treatment system 20. As described above, the computer model of the exhaust gas treatment system 20 models the operation of the exhaust gas treatment system 20, and predicts the quantity of particulate matter burnt based upon the various different operating parameters sensed and/or monitored by the control module 32. The control module 32 uses the estimated quantity of particulate matter burnt to define a particulate matter burn rate during the defined time period. The particulate matter burn rate is defined by dividing the estimated quantity of particulate matter being burnt by the period of time elapsed during the defined time period.

Once the particulate matter burn rate is defined, the quantity of fuel used is compared with the calculated particulate matter burn rate to define a regeneration fuel efficiency ratio during the defined time period, generally indicated by box 50. The regeneration fuel efficiency ratio may be calculated, for example, by dividing the quantity of fuel used during the defined time period by the particulate matter burn rate during the defined time period. It should be appreciated that the regeneration fuel efficiency ratio may be expressed in some other manner, such as for example dividing the particulate matter burn rate by the quantity of fuel used during the defined time period.

A minimum regeneration fuel efficiency rate is defined. The minimum regeneration fuel efficiency rate is a calibratable level used to define a minimum threshold used to determine if the regeneration event is an efficient use of fuel or not. The regeneration fuel efficiency ratio is then compared to the minimum regeneration fuel efficiency rate to determine if the regeneration event is an efficient use of fuel or is not an efficient use of fuel, generally indicated by box 52. When the comparison of the regeneration fuel efficiency ratio to the minimum regeneration fuel efficiency rate indicates that the regeneration event is not an efficient use of fuel, generally indicated at 54, then the regeneration event is stopped, generally indicated by box 56, prior to the estimated completion of the regeneration event. When the comparison of the regeneration fuel efficiency ratio to the minimum regeneration fuel efficiency rate indicates that the regeneration event is an efficient use of fuel, generally indicated at 58, then the regeneration event is continued, generally indicated by box 60.

For example, the regeneration fuel efficiency ratio may be compared to the minimum regeneration fuel efficiency rate to determine if the regeneration fuel efficiency ratio is less than, equal to, or greater than the minimum regeneration fuel efficiency rate. An efficient use of fuel may be defined as the regeneration fuel efficiency ratio being equal to or greater than the minimum regeneration fuel efficiency rate, while a not efficient use of fuel may be defined as the regeneration fuel efficiency ratio being less than the minimum regeneration fuel efficiency rate. Accordingly, the minimum regeneration fuel efficiency rate may be defined to equal a number Z. If the quotient of the regeneration fuel efficiency ratio divided by the minimum regeneration fuel efficiency rate is less than Z, then the control module 32 may determine that the continued use of fuel for the regeneration event is not an efficient use of fuel, and may stop the regeneration event prior to the estimated completion time to improve the overall fuel efficiency of the vehicle. However, if the quotient of the regeneration fuel efficiency ratio divided by the minimum regeneration fuel efficiency rate is equal to or greater than Z, then the control module 32 may determine that the injection of fuel into the exhaust gas to maintain the regeneration event is an efficient use of fuel and may continue the regeneration event until either the regeneration event is fully complete, or the control module 32 determines that the injection of fuel into the exhaust gas is no longer an efficient use of fuel.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of controlling an exhaust gas treatment system of a vehicle, the method comprising:
    detecting the start of a regeneration event in which accumulated particulate matter is burnt from a particulate filter;
    monitoring a quantity of fuel used by the vehicle during a defined time period of the regeneration event;
    estimating a quantity of particulate matter being burnt from the particulate filter during the defined time period of the regeneration event to define a particulate matter burn rate;
    comparing the quantity of fuel used with the calculated particulate matter burn rate to define a regeneration fuel efficiency ratio;
    comparing the regeneration fuel efficiency ratio to a minimum regeneration fuel efficiency rate to determine if the regeneration event is an efficient use of fuel or is not an efficient use of fuel; and
    stopping the regeneration event prior to an estimated completion of the regeneration event when the comparison of the regeneration fuel efficiency ratio to the minimum regeneration fuel efficiency rate indicates that the regeneration event is not an efficient use of fuel.

2. A method as set forth in claim 1 further comprising defining the minimum regeneration fuel efficiency rate.

3. A method as set forth in claim 1 further comprising providing an engine control unit configured to control the regeneration event.

4. A method as set forth in claim 1 further comprising estimating a quantity of particulate matter accumulated on the particulate filter to determine if a regeneration event is required.

5. A method as set forth in claim 1 further comprising estimating a time duration to completely regenerate the particulate filter.

6. A method as set forth in claim 1 wherein estimating a quantity of particulate matter being burnt from the particulate filter includes predicting the quantity of particulate matter being burnt from the particulate filter with a computer model of the exhaust gas treatment system configured to model the operation of the exhaust gas treatment system.

7. A method as set forth in claim 6 wherein estimating a quantity of particulate matter being burnt from the particulate filter during the regeneration event to define a particulate matter burn rate includes dividing the estimated quantity of particulate matter being burnt by the defined time period to define the particulate matter burn rate during the defined time period.

8. A method as set forth in claim 1 further comprising defining the defined time period.

9. A method as set forth in claim 8 wherein defining the defined time period includes defining the defined time period to include a period of time immediately preceding a threshold.

10. A method as set forth in claim 9 wherein defining the defined time period includes defining the threshold to equal a completion percentage of the regeneration event.

11. A method as set forth in claim 1 wherein comparing the quantity of fuel used over a defined time period of the regeneration event with the calculated particulate matter burn rate during the defined time period of the regeneration event is further defined as dividing the quantity of fuel used during the defined time period by the particulate matter burn rate during the defined time period to define the regeneration fuel efficiency ratio.

12. A method as set forth in claim 11 wherein comparing the regeneration fuel efficiency ratio to the minimum regeneration fuel efficiency rate is further defined as comparing the regeneration fuel efficiency ratio to the minimum regeneration fuel efficiency rate to determine if the regeneration fuel efficiency ratio is less than, equal to, or greater than the minimum regeneration fuel efficiency rate.

13. A method as set forth in claim 12 wherein an efficient use of fuel is defined as the regeneration fuel efficiency ratio being equal to or greater than the minimum regeneration fuel efficiency rate, and wherein a not efficient use of fuel is defined as the regeneration fuel efficiency ratio being less than the minimum regeneration fuel efficiency rate.

14. A method of controlling a vehicle, the method comprising:
   providing an engine control unit operable to control the operation of a regeneration event, including:
      monitoring the operation of the vehicle to predict accumulation of particulate matter on a particulate filter of an exhaust gas treatment system;
      initiating a regeneration event when the predicted accumulation of the particulate matter on the particulate filter indicates that regeneration of the particulate filter is required;
      sensing a quantity of fuel used by the vehicle during a defined time period of the regeneration event;
      predicting a quantity of particulate matter being burnt from the particulate filter during the defined time period with a computer model of the exhaust gas treatment system configured to model the operation of the exhaust gas treatment system, to define a particulate matter burn rate during the defined time period;
      comparing the quantity of fuel used with the calculated particulate matter burn rate to define a regeneration fuel efficiency ratio during the defined time period;
      comparing the regeneration fuel efficiency ratio to a minimum regeneration fuel efficiency rate to determine if the regeneration event is an efficient use of fuel or is not an efficient use of fuel; and
      stopping the regeneration event prior to an estimated completion of the regeneration event when the comparison of the regeneration fuel efficiency ratio to the minimum regeneration fuel efficiency rate indicates that the regeneration event is not an efficient use of fuel.

15. A method as set forth in claim 14 wherein the engine control unit is operable to estimate a time duration required to completely regenerate the particulate filter.

16. A method as set forth in claim 14 wherein the engine control unit is operable to define the defined time period to include a period of time immediately preceding a threshold.

17. A method as set forth in claim 16 wherein defining the defined time period includes defining the threshold to equal a completion percentage of the regeneration event.

18. A method as set forth in claim 14 wherein comparing the quantity of fuel used with the calculated particulate matter burn rate to define a regeneration fuel efficiency ratio during the defined time period is further defined as dividing the quantity of fuel used during the defined time period by the calculated particulate matter burn rate during the defined time period to define the regeneration fuel efficiency ratio.

19. A method as set forth in claim 18 wherein comparing the regeneration fuel efficiency ratio to the minimum regeneration fuel efficiency rate is further defined as comparing the regeneration fuel efficiency ratio to the minimum regeneration fuel efficiency rate to determine if the regeneration fuel efficiency ratio is less than, equal to, or greater than the minimum regeneration fuel efficiency rate.

20. A method as set forth in claim 19 wherein an efficient use of fuel is defined as occurring when the regeneration fuel efficiency ratio is equal to or greater than the minimum regeneration fuel efficiency rate, and wherein a not efficient use of fuel is defined as occurring when the regeneration fuel efficiency ratio is less than the minimum regeneration fuel efficiency rate.

* * * * *